United States Patent
Streichert et al.

(10) Patent No.: US 8,629,683 B2
(45) Date of Patent: Jan. 14, 2014

(54) TOUCH-SENSITIVE SENSOR ARRANGEMENT INCLUDING A PLANAR-SHAPED ELEMENT HAVING A CONDUCTIVE LAYER AND A NUMBER OF CONNECTING POINTS THAT ARE EACH ARRANGED IN AN EDGE AREA OF THE ELEMENT AND CONTACTING THE CONDUCTIVE LAYER

(75) Inventors: Gerhard Streichert, Postbauer-Heng (DE); Horst Wolf, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 316 days.

(21) Appl. No.: 13/100,718

(22) Filed: May 4, 2011

(65) Prior Publication Data
US 2011/0273195 A1 Nov. 10, 2011

(30) Foreign Application Priority Data
May 5, 2010 (EP) .................................... 10161949

(51) Int. Cl.
*G01R 27/26* (2006.01)
*G01R 27/08* (2006.01)

(52) U.S. Cl.
USPC .......................................... 324/658; 324/691

(58) Field of Classification Search
None
See application file for complete search history.

(56) References Cited

U.S. PATENT DOCUMENTS

| | | | |
|---|---|---|---|
| 4,595,260 A * | 6/1986 | Kubota | 349/5 |
| 2005/0285994 A1* | 12/2005 | Park et al. | 349/72 |
| 2011/0134069 A1* | 6/2011 | Shen | 345/174 |

FOREIGN PATENT DOCUMENTS

WO   WO 02/052495   7/2002

* cited by examiner

Primary Examiner — Vinh Nguyen
(74) Attorney, Agent, or Firm — Cozen O'Connor

(57) ABSTRACT

A touch-sensitive sensor arrangement includes a planar-shaped element having a surface provided with a conductive layer, and a plurality of connecting points that are each arranged in an edge area of the element and contacting the conductive layer, wherein a respective decoupling device is arranged for decoupling a current, which is applied to at least two connecting points, from an evaluating signal, between each of the respective connecting points and associated connecting lines for the evaluation of a position of a contact of the element with a contacting object, where the element is heatable by the current.

10 Claims, 2 Drawing Sheets

TOUCH-SENSITIVE SENSOR ARRANGEMENT INCLUDING A PLANAR-SHAPED ELEMENT HAVING A CONDUCTIVE LAYER AND A NUMBER OF CONNECTING POINTS THAT ARE EACH ARRANGED IN AN EDGE AREA OF THE ELEMENT AND CONTACTING THE CONDUCTIVE LAYER

BACKGROUND OF THE INVENTION

1. Field of the Invention

The invention relates to a sensor and, more particularly, to a touch-sensitive sensor arrangement comprising a planar-shaped element having a conductive layer and a number of connecting points that are each arranged in an edge area of the element and contacting the conductive layer.

2. Description of the Related Art

Touch-sensitive sensor arrangements are also known as touch sensors. In a joint construction with a screen, these touch sensors form a touch-sensitive screen that is also called a touch screen. When touching a screen surface formed by the touch sensor, the touch sensor can trigger actions that are suitable for controlling an electrical device. Such touch screens are currently used in input devices, such as for vehicle diagnostics, in industry and plant control, in industrial PCs, in medical technology, in cash points or in handheld computers that, for example, can be operated with a pen input.

If the above-mentioned devices are used in a physically demanding environment, e.g., very cold places, the screen surface or the contact area can become covered with dew or can freeze, which impairs the proper operation of the sensor arrangement.

WO 02/052495 A2 discloses a known display having an electrically conductive layer. In accordance with such conventional display devices, it is also known to use heating for the screen surface. However, it is a disadvantage in such a conventional device that a heating device is arranged on an additional glass pane. In this arrangement, the additional glass pane is arranged behind a glass pane of the actual touch sensor. This has the disadvantage that the additional glass pane causes additional light refraction in the beam path of the display, which results in lower screen brightness, a lower screen contrast, and entails a parallax error due to a greater distance of the sensor arrangement from the display.

SUMMARY OF THE INVENTION

It is therefore an object of the invention to provide a sensor arrangement that can be used for a touch screen, which is heatable but which manages without an additional glass pane.

This and other object and advantages are achieved in accordance with the invention by a touch-sensitive sensor arrangement having a planar-shaped element with a conductive layer and connecting points contacting the conductive layer. A decoupling device is arranged for decoupling a current, which is applied to at least two of the connecting points, from an evaluating signal, where the element is heatable by the current. The planar-shaped element comprised in the sensor arrangement is, for example, a glass pane that is provided with a conductive layer by vapor deposition with metal. This conductive layer is used in the sensor arrangement for determining a contacted screen position in accordance with a capacitive method or in accordance with a resistively operating method of the sensor arrangement.

In the accordance with a capacitive method of the invention, a surface of the element, preferably a glass pane, is divided into a capacitive matrix. This matrix is capacitively influenced by contact with a contacting object, such as a finger of a human hand, which allows conclusions to be drawn with respect to the XY coordinates of the contact. Here, a slight field, which can be evaluated over the connecting points with the associated connecting lines, is generated on the glass surface, preferably by a metallic coating of indium tin oxide (ITO). An evaluation of the evaluating signal for position determination cannot be performed at the same time as a heating current flows through the metallic layer. As a result, the heating current that is applied is separated from the evaluating signal by a decoupling device at the connecting points. The position determination in a capacitively operating sensor arrangement is performed on the planar-shaped element by alternating current signals, preferably a high-frequency alternating current. Consequently, a suitable coupling device can be selected that does not pass a heating current applied as direct current but still passes the, for example, high-frequency evaluating signal.

In an advantageous embodiment, the decoupling device is accordingly constructed as a galvanic or electrical isolation. Here, the decoupling device is preferably constructed as a capacitive isolation. Consequently, between a connecting point and a connecting line for signal evaluation, a capacitor could be arranged for capacitive isolation or a coil could be arranged for inductive isolation.

In an alternative embodiment for galvanic or electrical isolation, each decoupling device is constructed as a switching element that isolates the connecting points from the connecting lines for the evaluating signal. These switching elements can be constructed both electromechanically or also as switching semiconductors. A switching element could be arranged, for example, at the connecting point with a first connecting side and can be connected to a connecting line with a second connecting side and to a heating line with a third connecting side. Accordingly, the switching element would function as a change-over switch and switch back and forth between the evaluating line and the heating line in a desired alternating cycle. Accordingly, time intervals are produced in which the sensor arrangement is switched free of a heating current and can perform a position recognition, and time intervals are produced in which the sensor arrangement is switched free of the connecting lines for evaluating the evaluating signal and the sensor arrangement or the metallic surface, respectively, can be fed with a heating current.

The switching elements are advantageously constructed such that they are controllable with a control circuit. Here, a multiplexer circuit is advantageously used that controls the decoupling by a temporal multiplexing method. While a direct voltage is connected to the metallic face to achieve the heating effect, the capacitive touch evaluation is switched off and disconnected. Conversely, the heating voltage is switched off when the capacitive evaluation is active. If such a change occurs, preferably several times per second, especially at a frequency of at least 10 Hz, a user will scarcely notice a delay when triggering a function on the sensor surface since, as a rule, the response time of a person is within the range of one second.

In contrast to the capacitive method, a widely used technology of constructing a touch sensor is a resistive method that operates with two transparent conductively coated surfaces, where, e.g., a surface can be applied to a solid glass plate and the further surface can be applied on a flexible foil that is located at a slight distance above the glass plate. The distance between the two coated faces is preferably specified by small, barely visible, spacers. Pressure on the sensor arrangement creates an electric contact between the two metallically coated surfaces, which can be evaluated as a change in resistance and thus a position can be determined. Particularly in the case of a sensor arrangement in a resistively operating method, the use of a decoupling device that is configured as switching elements is advantageous. With the switching elements, a direct current connected for the evaluation of the position determination can then be isolated from a heating current that is also sent as a direct current through the metallically coated surface.

Significant advantages are the simultaneous utilization of a single metalized layer for two functions. The first function is the detection of a position and the second function is the heating, for example, of a glass pane. A second glass pane with a second metalized layer can thus be omitted. Here, multiple light refraction, which would otherwise arise at the boundaries of the second glass pane, ceases to occur. An inserted LCD display can be moved distinctly closer to the glass pane that now only exists by itself, which distinctly reduces a parallax error when watching from the side.

Other objects and features of the present invention will become apparent from the following detailed description considered in conjunction with the accompanying drawings. It is to be understood, however, that the drawings are designed solely for purposes of illustration and not as a definition of the limits of the invention. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The drawing shows exemplary embodiments comprising further features, in which.

DETAILED DESCRIPTION OF THE PRESENTLY PREFERRED EMBODIMENTS

Figure 1:
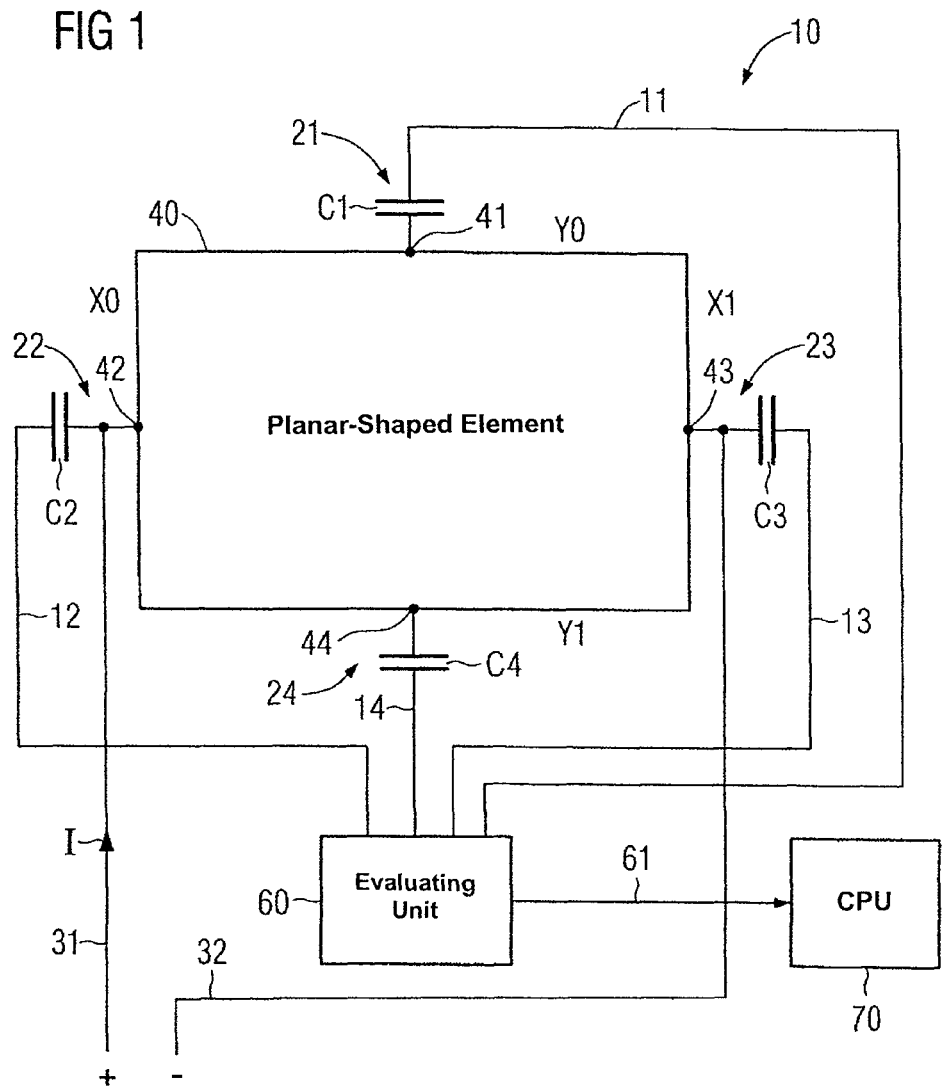
FIG. 1 is a schematic block diagram of a sensor arrangement with a decoupling device in accordance with an embodiment of the invention.

Depicted in FIG. 1 is a touch-sensitive sensor arrangement 10 with a planar-shaped element 40, where one surface of the element 40 is provided with a conductive layer. The planar-shaped element 40 comprises a glass pane that is coated with an indium tin oxide (ITO) layer as a metalized layer. In its edge areas on the right and on the left, X0, X1 and at the top and at the bottom, Y0, Y1, the glass pane includes a first connecting point 41 in the edge area Y0, a fourth connecting point 44 in the edge area Y1, a second connecting point 42 in the edge area X0 and a third connecting point 43 in the edge area X1. The connecting points 41, 42, 43, 44 are each provided with a decoupling device 21, 22, 23, 24, where the decoupling devices 21, 22, 23, 24 comprise a first capacitor C1, a second capacitor C2, a third capacitor C3 and a fourth capacitor C4 allocated to the corresponding connecting points, respectively.

A first heating line 31 is directly connected to the second connecting point 42. A second heating line 32 is directly connected to the third connecting point 43. A direct current, which can flow through the first heating line 31 to the second connecting point 42 and through the metalized ITO layer of the glass pane to the third connecting point 43 and is conducted back through the second heating line 32 to a current source or voltage supply provided for the heating, is fed into the first heating line 31. This current flow I, from the second connecting point 42 to the third connecting point 43, provides a heating effect in the glass pane due to its power loss in the metallic layer.

Due to the second decoupling device 22 that comprises a second capacitor C2, the current flow I for the heating cannot flow back across the second capacitor C2 through a second connecting line 12 to an evaluating unit 60.

The evaluating unit 60 for evaluating an evaluating signal for position determination is coupled to the glass pane at each one of the four connecting points 41, 42, 43, 44 by a corresponding first connecting line 11, a second connecting line 12, a third connecting line 13 and a fourth connecting line 14, where galvanic or electrical isolation is produced by the capacitors C1, C2, C3, C4. The capacitors C1, C2, C3, C4 block the heating current designed as direct current that is thus unable to flow into the evaluating unit and would lead to evaluation disturbances. The evaluation of the position determination is preferably performed with high-frequency alternating signals. As a result, the capacitors C1, C2, C3, C4 do not form an obstacle to the alternating signals.

The evaluating unit 60 is connected to a CPU 70 over a data line 61. The CPU 70 controls a position determination that can be displayed on a screen.

Figure 2:
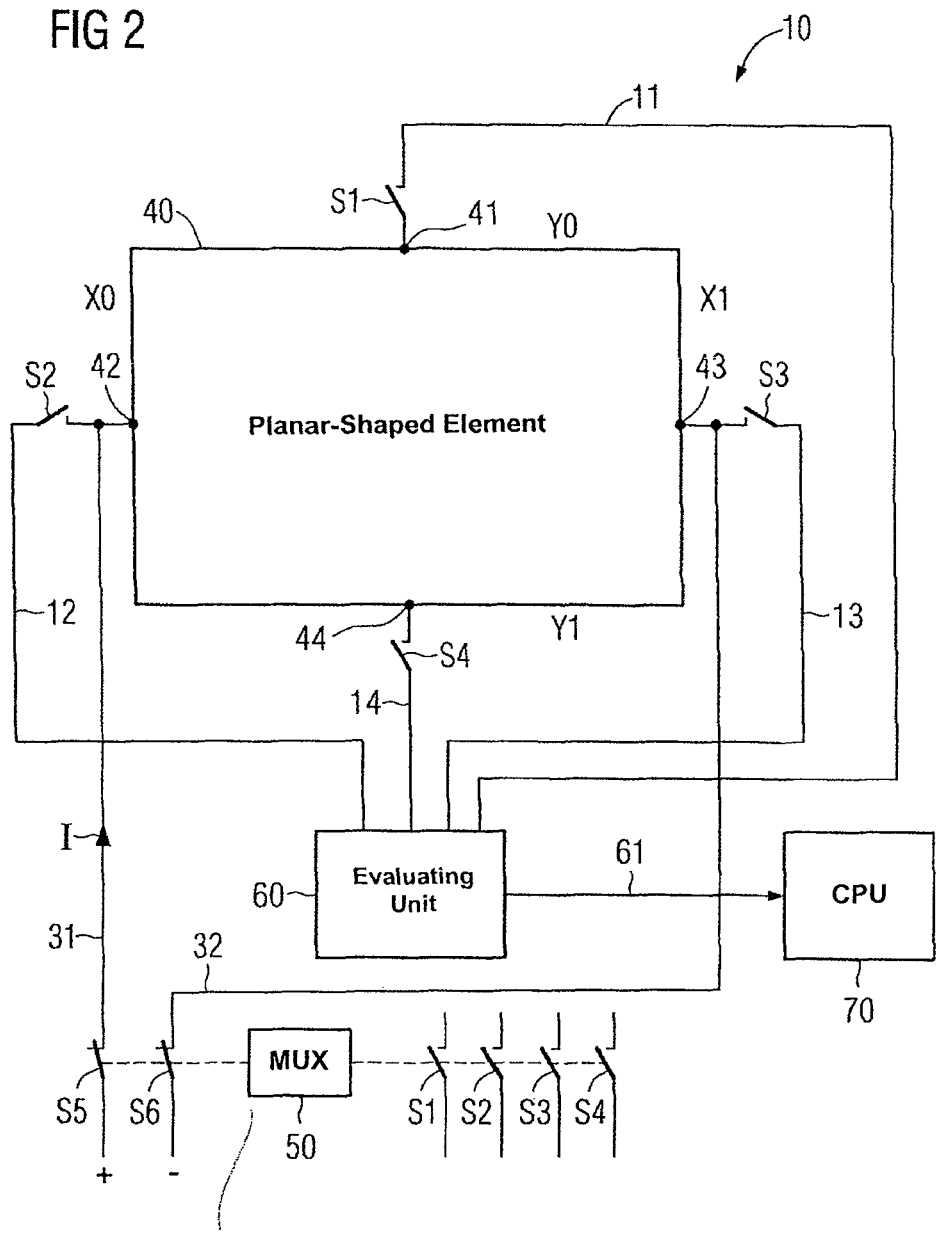
FIG. 2 is a schematic block diagram of a sensor arrangement with a decoupling device in accordance with an alternative embodiment of the invention.

FIG. 2 is a block diagram of a sensor arrangement 10 also having a decoupling device, where the decoupling device is not constructed as a galvanic or electrical isolation in this alternative embodiment but as switching elements S1, S2, S3, S4. A first switching element S1 is connected to the first connecting point 41, a second switching element S2 is connected to the second connecting point 42, a third switching element S3 is connected to the third connecting point 43 and a fourth switching element S4 is connected to the fourth connecting point 44. The switching elements S1, S2, S3, S4 are configured as circuit isolators. The respective other terminal of each switching element is connected to a respective connecting line 11, 12, 13, 14 that leads to an evaluating unit 60. Here, a first heating line 31 is similarly connected to the second connecting point 42 and a second heating line 32 is connected to the third connecting point 43. As explained with respect to FIG. 1, the current I can flow through this heating line 31, 32 from the edge area X0 to the edge area X1 and the element 40, i.e., the glass pane, can be heated by the heat loss that is produced.

A control circuit 50, comprising a multiplexer circuit, controls the switching elements S1, S2, S3, S4. The associated connecting lines 11, 12, 13, 14 are isolated from the evaluating unit 60 by the switching elements S1, S2, S3, S4. However, this isolation is only performed in cases when a heating current is fed in through the first heating line 31 and the second heating line 32. To prevent the feeding-in of the heating current, a fifth switching element S5 is arranged between a power supply for the heating and the first heating line 31 and a sixth switching element S6 is arranged in the second heating line 32. The switching elements S5, S6 are opened for the time in which the switching elements S1, S2, S3, S4 are closed. Due to the decoupling device, simultaneous utilization of a metalized layer for two functions is also possible in embodiments that include switching elements.

Figure 3:
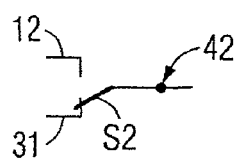
FIG. 3 is a schematic block diagram of a switching element comprising a decoupling device in accordance with an embodiment of the invention.

FIG. 3 is an illustration of an alternative switching element taking the second switching element S12 as an example. In this alternative embodiment, the switching element S2 comprises a change-over switch, and is attached with its first connecting side to the second connecting point. A second connecting side of the switching element 12 is conducted to the second connecting line 12. A third connecting side of the switching element S2 is conducted to the first heating line 31. The switching element S2 can thus switch back and forth between the second connecting line 12 and the first heating line 31 in a change-over switching action, preferably again controlled by a multiplexer.

Thus, while there are shown, described and pointed out fundamental novel features of the invention as applied to preferred embodiments thereof, it will be understood that various omissions and substitutions and changes in the form and details of the illustrated apparatus, and in its operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice.

What is claimed is:

1. A touch-sensitive sensor arrangement comprising:
    a planar-shaped element having a surface provided with a conductive layer;
    a plurality of connecting points, each of the plurality of connecting points being arranged in an edge area of the planar-shaped element and contacting the conductive layer;
    contacting lines connected respectively to the connecting points for evaluation of a position of a contact of the planar-shaped element; and a decoupling device arranged between each of the connecting points and a respective one of the contacting lines, said decoupling device decoupling a current applied to at least two connecting points from an evaluating signal;
    wherein the planar-shaped element is heatable by the current.

2. The touch-sensitive sensor arrangement as claimed in claim 1, wherein the plurality of connecting points comprises a first connecting point, a second connecting point, a third connecting point and a fourth connecting point; and
    wherein a first connecting line, a second connecting line, a third connecting line and a fourth connecting line, are respectively connected to the first, second, third and fourth connecting points of the plurality of connecting points through the respective decoupling device;
    wherein a first heating line is connected to the second connecting point and a second heating line is connected to the third connecting point such that the current is not conducted through the decoupling device.

3. The touch-sensitive sensor arrangement as claimed in claim 2, wherein the decoupling device is configured to provide galvanic isolation.

4. The touch-sensitive sensor arrangement as claimed in claim 2, wherein each respective decoupling device comprises a switching element which isolates each of the plurality of connecting points from the first, second, third and forth connecting lines for the evaluating signal.

5. The touch-sensitive sensor arrangement as claimed in claim 4, further comprising a control circuit configured to control the switching element of said each respective decoupling device.

6. The touch-sensitive sensor arrangement as claimed in claim 5, wherein the control circuit controls the switching element such that one of the first, second, third and fourth connecting lines and the first and second heating lines are connected to the first, second, third and fourth connecting points in a predeterminable cycle.

7. The touch-sensitive sensor arrangement as claimed in claim 1, wherein the decoupling device is configured to provide galvanic isolation.

8. The touch-sensitive sensor arrangement as claimed in claim 7, wherein the decoupling device is configured to provide capacitive isolation.

9. The touch-sensitive sensor arrangement as claimed in claim 7, wherein the decoupling device is configured to provide inductive isolation.

10. The touch-sensitive sensor arrangement as claimed in claim 1, further comprising an evaluating unit connected to the plurality of connecting lines.

* * * * *